United States Patent [19]

Yamamoto

[11] Patent Number: 5,333,125
[45] Date of Patent: Jul. 26, 1994

[54] OPTICAL INFORMATION PROCESSING APPARATUS HAVING A NEURAL NETWORK FOR INDUCING AN ERROR SIGNAL

[75] Inventor: Masakuni Yamamoto, Yamato, Japan
[73] Assignee: Canon Kabushiki Kaisha, Tokyo, Japan
[21] Appl. No.: 147,447
[22] Filed: Nov. 5, 1993

Related U.S. Application Data

[63] Continuation of Ser. No. 704,602, May 23, 1991, abandoned.

[30] Foreign Application Priority Data

May 25, 1990 [JP] Japan .................................. 2-133901

[51] Int. Cl.⁵ .............................................. G11B 7/13
[52] U.S. Cl. .............................. 369/44.34; 369/44.36; 369/44.29; 369/44.41; 395/22
[58] Field of Search ............... 369/44.41, 44.42, 44.12, 369/44.25, 44.26, 44.29, 44.35, 44.11, 54, 58, 120, 44.34, 44.36; 235/454, 455, 460, 459, 470; 395/22

[56] References Cited

U.S. PATENT DOCUMENTS 4,945,494  7/1990  Penz et al. .......................... 395/22
4,965,443  10/1990  Yamasaki et al. ................. 250/201.7
4,972,400  11/1990  Kuwabara et al. ............... 369/44.35
4,977,551  12/1990  Minami et al. .................... 369/44.32

FOREIGN PATENT DOCUMENTS 0270365  6/1988  European Pat. Off. .

OTHER PUBLICATIONS

Nature; "Learning Representations by Back-Propagating Errors"; Rumelhart et al., vol. 323, pp. 533–536; Oct. 9, 1986.

Primary Examiner—Aristotelis Psitos
Assistant Examiner—Muhammad N. Edun
Attorney, Agent, or Firm—Fitzpatrick, Cella, Harper & Scinto

[57] ABSTRACT

An optical information processing apparatus is provided for at least either recording or reproducing information by projecting a converging light beam on a recording medium. The optical information processing apparatus includes a light detector for receiving the light beam, a neural network for inducing a tracking or focusing error signal from an output signal of the light detector, and a servo device for performing a tracking or focusing servo operation in accordance with the tracking or focusing error signal induced by the neural network.

31 Claims, 8 Drawing Sheets

OPTICAL INFORMATION PROCESSING APPARATUS HAVING A NEURAL NETWORK FOR INDUCING AN ERROR SIGNAL

This application is a continuation of application Ser. No. 07/704,602 filed May 23, 1991, now abandoned.

BACKGROUND OF THE INVENTION

1. Field of the Invention

The present invention relates to an optical information processing apparatus for recording and/or reproducing information on a recording medium such as light disks and light cards and, more particularly to an optical information processing apparatus having at least either a tracking servomechanism or a focusing servomechanism.

2. Description of the Prior Art

A track for recording information is formed in the form of a concentric circle or spirally on an information recording medium such as light disks. On a light card, a plurality of tracks are formed in parallel in accordance with its shape. When recording or reproducing information on such a recording medium, a light spot is focused on a target track, and it scans the target track while maintaining a focused state.

That is, by means of auto-focusing for focusing the light spot on the target track and auto-tracking control for allowing the light spot to follow up the target track, the information can be recorded on the target track or the information on the target track can be read out.

To perform such an auto-tracking or auto-focusing operation, a change in light distribution of reflected light from the information recording medium or a change in the amount of light itself is detected to determine the amount of change of the spot from the track center position or the focused position. A control signal is then transmitted corresponding to the amount of change to an actuator, a device for shifting an objective lens, in order to shift the objective lens. Then the spot will be returned to the track center position or the focused position.

Figure 1:
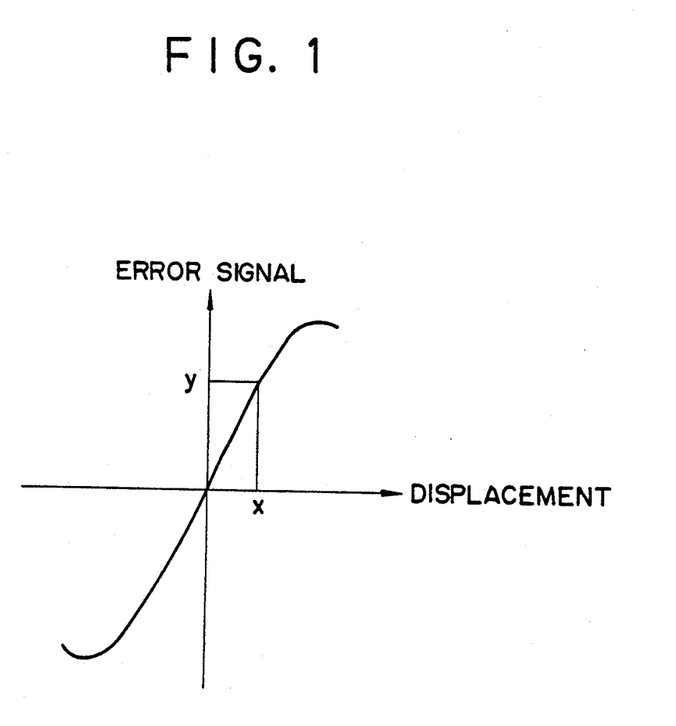
FIG. 1 is a view showing an example of basic tracking and focusing error signals.

Assuming the change in light distribution or the change in the amount of light itself generates an error signal in this case, the change in the error signal with respect to the displacement of the spot is as shown in FIG. 1. FIG. 1 is generally called an "S-shaped curve", and it is desired that there should be no offset, that is, the error signal should be 0 when the displacement is 0, and that it should be symmetrical against a+ and − change and be preferably linear.

As conventional detection systems for tracking error signals, there are the push-pull method, the heterodyne method, etc. Also as detection systems for focusing error signals, the astigmatism method, the critical angle method, etc., are known. In any of these systems, reflected light from an information recording medium is guided onto a divided photoelectric conversion element, and an error signal is generated from signals such as a difference, and a sum of detection signals obtained from each element.

In the auto-tracking and auto-focusing systems, of the above conventional example, however, such an offset as shown in FIG. 1 does not exist. However, there are the following problems in obtaining a center-symmetrical S-shaped curve.

(1) A narrow range of dispersion is characteristic for each of the split photoelectric conversion elements and for each element of the electric circuit incidental thereto, and the specification for those parts is severe.

(2) High precision of alignment is desired for each optical system including photoelectric conversion elements.

SUMMARY OF THE INVENTION

It is an object of the present invention to solve the above-mentioned problems of the prior art, and to provide an optical information processing apparatus capable of performing exact tracking or servo focusing even if there are dispersions in the characteristic of electrical elements of which the apparatus consists, and its adjustment method. According to the present invention, correct alignment for the optical system is not required when assembling the apparatus.

An optical information processing apparatus for at least either recording or reproducing information by projecting a converged light beam on a recording medium, which accomplishes the above object of the present invention, comprises a light detector for receiving the light beam which has been reflected by the medium or transmitted, a neural network for inducing at least either a tracking error signal or a focusing error signal from an output signal from the light detector, and servo means for performing at least either a tracking servo operation or a focusing servo operation in accordance with an error signal induced by the neural network.

An optical information processing apparatus according to an embodiment of the present invention, includes a light detector which comprises a plurality of photoelectric conversion elements, and a neural network which comprises a circuit for calculating the error signal by operating the plurality of weighted outputs after weighting the output for each of the plurality of photoelectric conversion elements.

A method of adjusting an optical information processing apparatus according to the above-mentioned embodiment, comprises the steps of locating the medium and the light beam at specified relative positions, comparing the error signal output from the neural network with a reference value, and changing the weight of the output for each of a plurality of photoelectric conversion elements in accordance with the comparison result.

Further, an apparatus for adjusting an optical information processing apparatus according to the above embodiment, comprises means for changing the relative positions of the medium and the light beam, means for comparing the error signal output from the neural network with the reference value, and means for changing the weight of the output of each of a plurality of photoelectric conversion elements in accordance with the comparison result.

DESCRIPTION OF THE PREFERRED EMBODIMENTS

Figure 2:
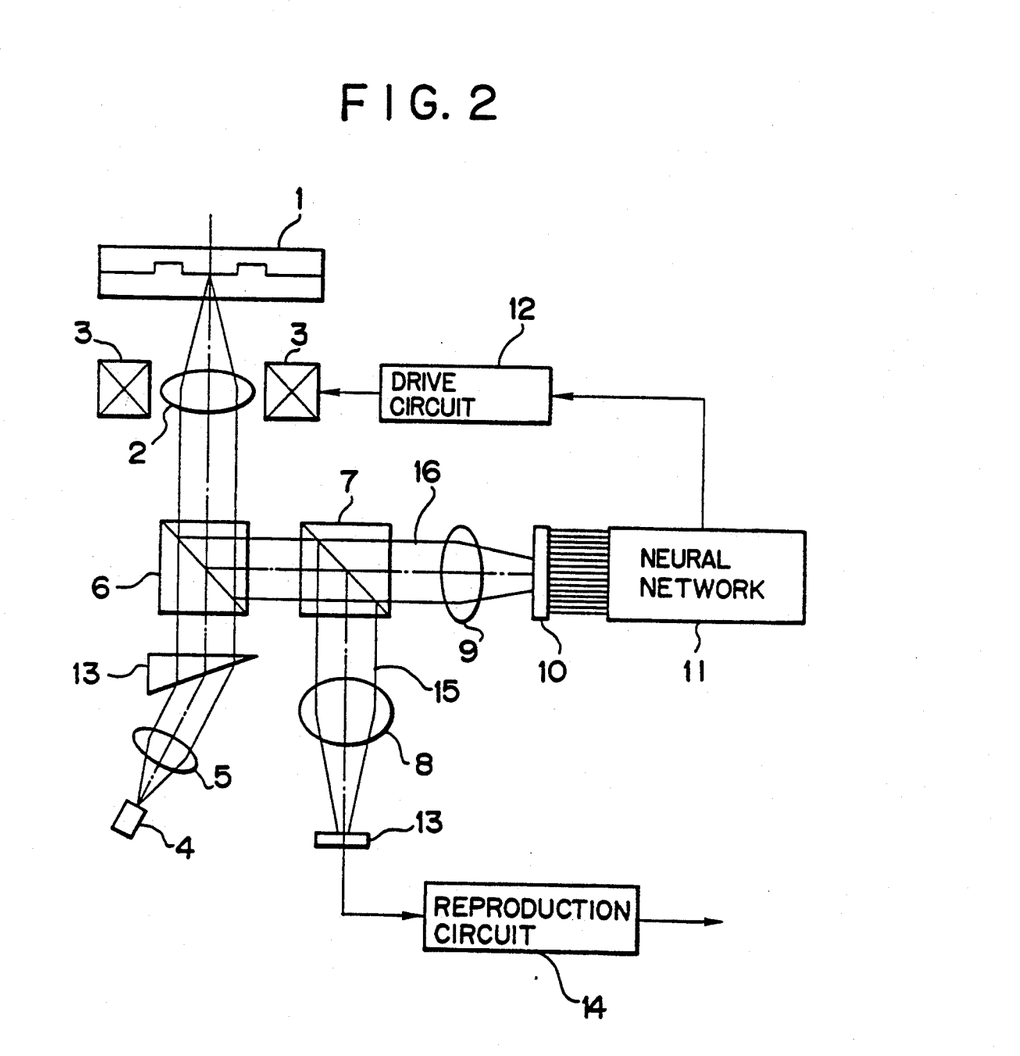
FIG. 2 is a schematic diagram showing an optical information processing apparatus according to an embodiment of the present invention.

FIG. 2 is a block diagram showing an optical information processing apparatus according to an embodiment of the present invention.

In FIG. 2, numeral 1 denotes a recording medium such as a light disk and light card, and numeral 2 denotes an objective lens disposed in close proximity to this medium 1. The objective lens 2 is so constructed that it moves in the tracking direction (perpendicular to the optical axis) and in the focusing direction (the optical axis direction) by being driven by an actuator 3.

Numeral 4 denotes a semiconductor laser provided as a light source, and light emitted by this laser is first corrected into a parallel light flux by a collimator lens 5. The laser light is corrected from an elliptical light flux to a cylindrical light flux by a shaped beam prism 13 thereafter, and is allowed to fall upon a first beam splitter 6. Then it is narrowed into a minute spot by the objective lens 2, and is irradiated on the recording medium 1.

To record the information, the semiconductor laser 4 is driven in accordance with a recording signal. The track on the recording medium 1 is scanned by the light beam, in which the intensity has been modulated, in accordance with the recording signal. To reproduce the information, the semiconductor laser 4 emits a light beam with a specified intensity, and the track, in which the information has been recorded, is scanned by this light beam.

On other hand, light reflected from the recording medium 1 passes through the objective lens 2 again, and is led to a first beam splitter 6. The first beam splitter 6 separates the incident light from the reflected light, and the reflected light is allowed to fall upon a second beam splitter 7.

The second beam splitter 7 separates the incident light into two beams. A light flux 15 on the one side, which has been reflected by the beam splitter 7, is converged by a sensor lens 8, and falls upon a light detector 13. A reproduction circuit 14 reproduces the information recorded in the medium from an output signal from this light detector by using a well-known system in a reproduction mode.

A light flux 16 on the other side, passing through the beam splitter 7, is converged on a multidivided photoelectric conversion element or light detector 10 by a converging lens 9. The multidivided photoelectric conversion element 10 is composed of numerous photoelectric conversion elements, and output signals from each element are output to each input cell in the input layer of a neural network 11.

The neural network 11 is a control device for performing tracking and focusing controls based on the output from the multidivided photoelectric conversion element 10 as will be discussed in detail later. Therefore, the neural network 11 outputs each error signal for tracking and focusing to a drive circuit or servo means 12. The drive circuit 12 drives an actuator 3 in accordance with this error signal to control the position of the objective lens 2. This controls the light spot so that the light spot on the recording medium 1 is located at the center of the target track and the focused position is maintained.

Figure 3:
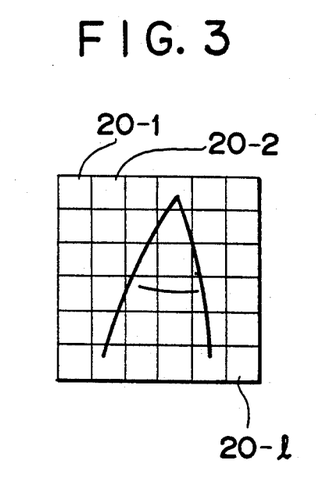
FIG. 3 is a view showing an example of an input unit used for hand-written character recognition.
Figure 4:
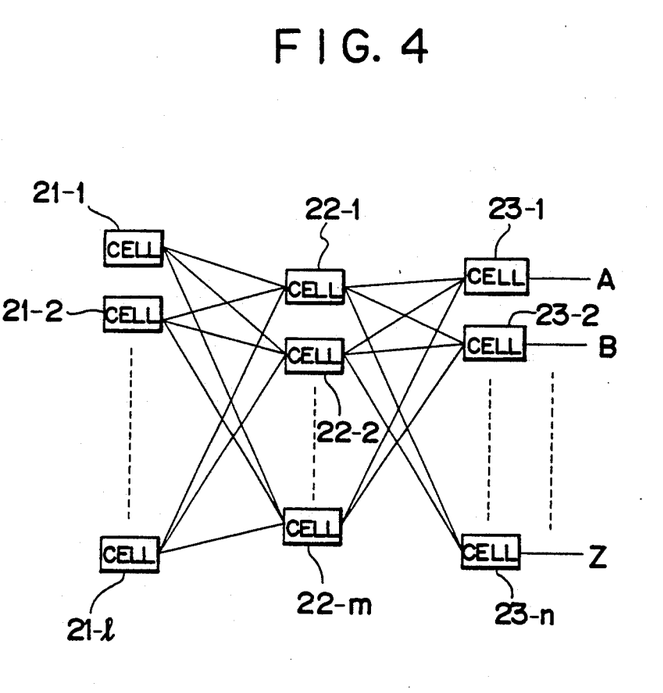
FIG. 4 is a block diagram showing an example of a neural network used for hand-written character recognition.

The above-mentioned neural network imitates a human information processing mechanism. Such a neural network using the learning method known as "Back propagation" as shown in FIGS. 3 and 4 is known. The principle of the neural network will be described referring to FIGS. 3 and 4 below. FIGS. 3 and 4 show examples for the recognition of hand-written characters using the neural network.

In FIG. 3, 20-1 to 20-$l$ are in input units which has been divided into 1 pieces. 21-1 to 21-$l$ shown in FIG. 4 are cells called an "Input layer", and a signal detected by each element in the input unit is given to each cell, 21-1 to 21-$l$, in the input layer, respectively. Each cell produces a signal which is given to each cell, 21-1 to 22-$m$, called an "Intermediate layer", which gives a weight to each input signal, and further, each cell in the intermediate layer produces a signal which is given to each cell, 23-1 to 23-$n$, called an "Output layer".

Each cell in the intermediate and output layers is a non-linear element which transmits an output signal when the input exceeds a fixed value. The weight of each cell is determined by an operation called "Learning". That is, a weight, which is given to each input signal, is changed from an error in the output against the input in accordance with mathematical premises. Repeating this operation causes the value of the weight to converge so that a correct value is output, respectively. Therefore, when the learning is complete, a recognition circuit for a hand-written character is formed in the form of the weight of each cell.

Figure 5:
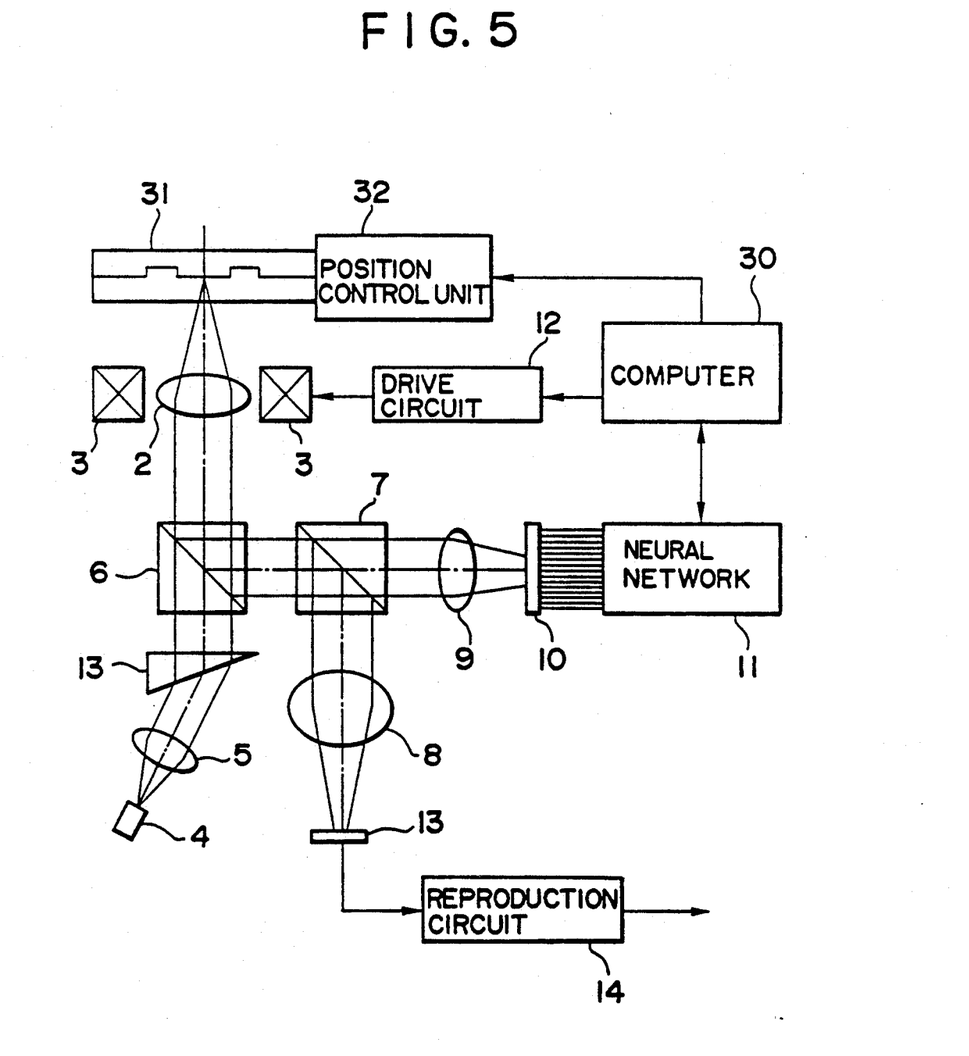
FIG. 5 is a schematic diagram showing a configuration example of an apparatus for allowing an optical information processing apparatus according to the present invention.

A method of learning for determining the weight of each cell within the neural network 11 will be described. This learning is performed using a device shown in FIG. 5 when manufacturing or adjusting a light head. A part of FIG. 5 shows the configuration, as it is, of the optical information process in FIG. 3 to be adjusted by this device. Accordingly, the same members in FIG. 5 as in FIG. 3 will be affixed with the same numerals, and the detailed description thereof is omitted.

In FIG. 5, the learning is automatically performed using a computer 30. The computer 30 is capable of controlling a position control unit 32 for controlling the position of a reference recording medium 31, and a drive circuit of servo means 12 for an actuator 3, and is capable of changing the positions of the reference recording medium 31 and the light spot. This enables the computer 30 to freely change the displacement of the light spot from the track center position or the focused position.

The computer 30 also reads the state of the output layer of the neural network 11 to calculate an error between the state and the state of a correct output layer (instructor signal). The computer 30 can successively change the weight of each cell within the neural network 11 in accordance with the error by using a regular mathematical method.

For instructor signals for tracking and focusing, an ideal S-shaped curve, each as an error signal to displacement, as shown in FIG. 1 is determined, and the device stores them in the memory within the computer 30 beforehand.

For the method of learning, the weight is changed for one displacement until a correct output can be obtained. Thereafter, the displacement is successively changed and the weight is changed until a correct output each can be obtained at respective displacements.

Figure 6:
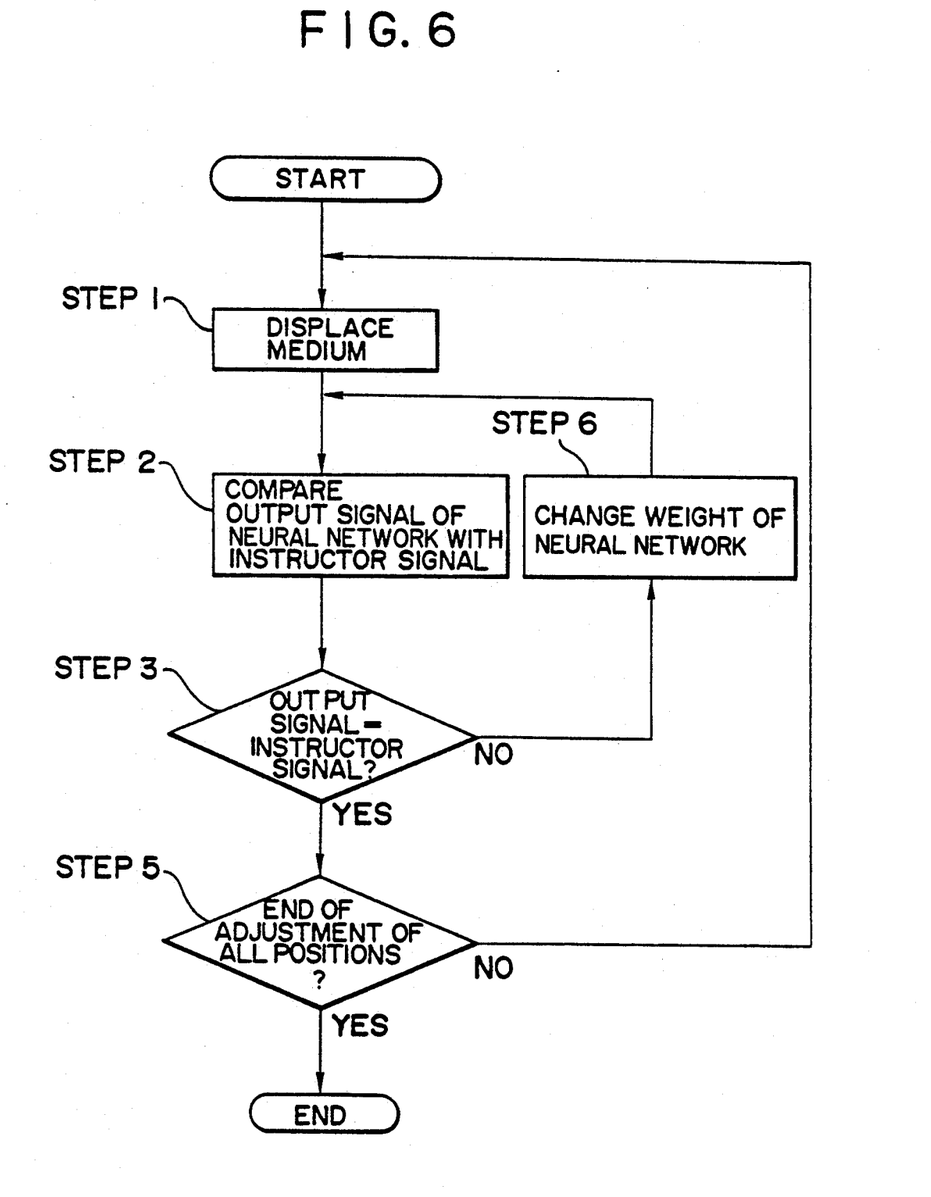
FIG. 6 is a flow chart for explaining the process of an optical information processing apparatus according to the present invention.

FIG. 6 is a flow chart for explaining the process of learning for such an apparatus according to the present invention. In this example, the relative reference positions for the medium and the light beam have been set at a plurality of places different from each other beforehand.

In step 1, the computer 30 first drives a position control unit 32 to displace the position of the medium in order to establish one of those relative reference positions. Then in step 2, the computer 30 compares the output signal from the neural network 11 with the instructor signal stored in the memory within the computer. As a result of the comparison, when both signals are different in step 3, the neural network changes the weight to be added to the output signal from the light detector in step 6, and returns to step 2. These processes in steps 2, 3 and 6 are repeated until the output signal from the neural network coincides with the instructor signal.

When both signals have coincided in step 3, the process proceeds to step 5 to make sure that the above adjustment has been performed at all of the plurality of set positions. When the adjustment has not been performed at all the positions, the method returns to step 1, and moves the medium to the next setting position to repeat the processes in steps 2, 3 and 6 until the output signal from the neural network coincides with the instructor signal.

When it has been determined in step 5 that the adjustment has been performed at all the set positions, the learning operation is completed.

As another method, it may be possible to change a round of weights for one displacement, and successively change a round of displacements. In this method, a round of weights is changed at respective displacements, and this operation is repeated until a correct output can be obtained at respective displacements.

The initial value for weight may be given from random number values, or a weight determined by a different method beforehand may be provided. By such an operation, the weight is recorded in the memory within the neural network 11 to complete the learning operation. Since the computer 30 is not required any longer when the learning operation has been completed, it is removed from the optical information processing apparatus.

Figure 7A:
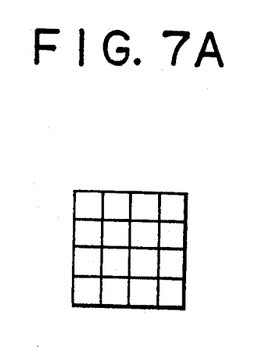
FIGS. 7A and 7B are views showing an example of photoelectric conversion elements used for an optical information processing apparatus according to the present invention.
Figure 7B:
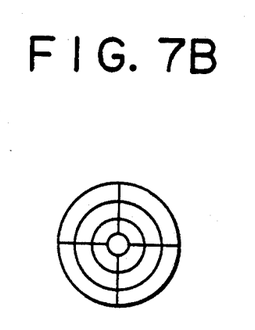

FIGS. 7A and 7B show an example of a divided surface of the multidivided photoelectric conversion element or light detector 10. FIG. 7A is an example of a square division, and FIG. 7B is an example of an annular division. The present invention is, of course, not limited these examples, but various modifications can be made.

Figure 8:
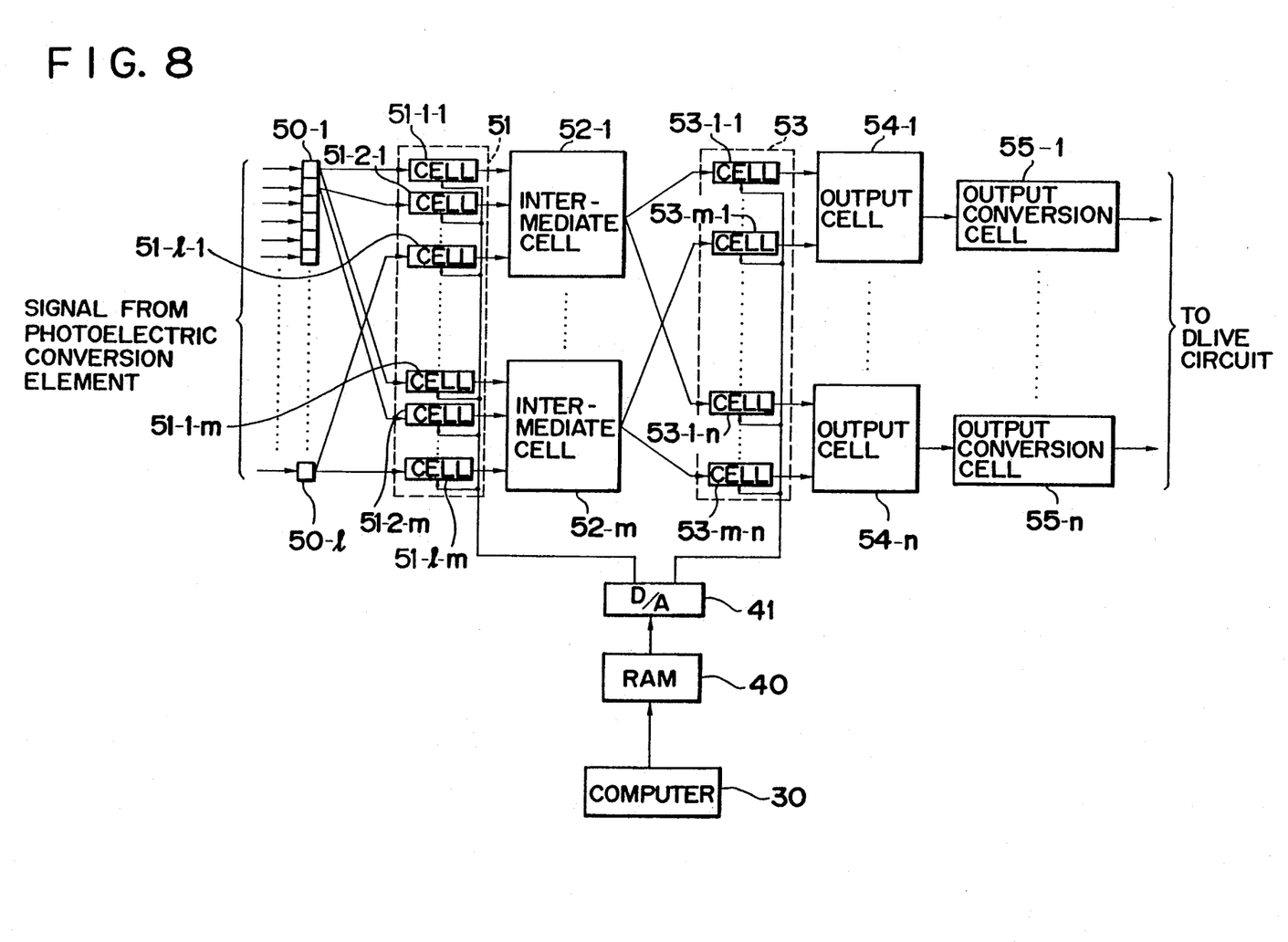
FIG. 8 is a block diagram showing a first configuration example of a neural network used for an optical information processing apparatus according to the present invention.

FIG. 8 is a concrete example of the neural network 11 based on the conventional back propagation method. In FIG. 8, 50-1 to 50-$l$ are cells in the input layer, and those electric signals are given to $l$ pieces of input cells 50-1 to 50-$l$, respectively, which have been photoelectrically converted by each element of the multidivided photoelectric conversion element 10 divided into $l$ pieces.

Numeral 51 is a weight cell, and each of m pieces of intermediate cells 52-1 to 52-$m$ has $l$ pieces of weight cells. For example, the output of an input cell 50-1 is divided into m pieces, and each of them is given to weight cells 51-1-1 to 51-1-$m$. Similarly, the output of input cells 50-2 to 50-$l$ is also divided into m pieces, and each of them is given to the corresponding weight cell. Each weight cell is an amplifier element, and its amplification factor is individually controlled by the computer 30.

For example, the respective amplification factors are stored in a random access memory (RAM) 40 as a digital signal. The stored values are converted into an analog signal by a digital/analog (D/A) converter 41 and are input into each weight cell. In this case, the computer 30 can rewrite the values stored in the RAM 40.

Each weight cell comprises an amplifier, a plurality of different load resistances, and an electronic switch which selectively connects these load resistances to the amplifier. Each weight cell switches the electronic switch in accordance with an input signal, and changes the amplification factor by changing the load resistance value. That is, the computer 30 controls this process through the RAM 40 so that an appropriate weight is applied to a signal to be output from the weight cell.

The signal, to which a weight has been applied by each weight cell, is input into the intermediate cell. For example, the output signal for weight cells 51-1-1 to 51-$l$-1 is input into an intermediate cell 52-1. Each intermediate cell is a non-linear element which adds for a positive input signal, subtracts for a negative signal, and outputs an output signal when the total value exceeds a certain threshold value.

53-1-1 to 53-$m$-$n$ are weight cells like 51-1-1 to 51-$l$-$m$, and each of n pieces of output cells has m pieces of weight cells. For example, the output of an intermediate cell 52-1 is divided into n pieces, and each of them is given to each weight cell corresponding thereto. Similarly, the output of each of other intermediate cells is also separated into n pieces, and is given to each of the weight cells corresponding thereto. Weight cells 53-1-1 to 53-$m$-$n$ are amplification elements like weight cells 51-1-1 to 51-$l$-$m$, and their amplification factor is controlled by the computer 30 in the same manner as the above.

The signal, to which a weight has been applied by each weight cell 53-1-1 to 53-$m$-$n$, is input into output cells 54-1 to 54-$n$. For example, the signal for weight cells 53-1-1 to 53-$m$-1 is input into an output cell 54-1. Each output cell consists of the non-linear element, which adds for a positive input signal, subtracts for a negative input signal, and outputs an output signal when the total value exceeds a certain threshold value in the same way as the above-mentioned intermediate cell.

The output signal from each of these output cells is given to output conversion cells 55-1 to 55-$n$ corresponding, respectively, thereto. Each output cell is a cell which corresponds to the displacement of the respectively determined light spots, and the output conversion cell converts the output signal from the output cell into an error signal corresponding to the respective displacement.

For example, an output cell 54-1 is assumed to be a cell which recognizes an displacement x shown in FIG.

1. When there is an input corresponding to the displacement x in this case, the output cell 54-1 outputs an output signal, and the output conversion cell 55-1, which has received it, outputs an error signal y as an output signal from the neural network.

The computer 30 reads the state of output of the output conversion cell, and calculates the difference between this and the instructor signal to determine the respective amplification factors of weight cells 51-1-1 to 51-$l$-$m$ and 53-1-1 to 53-$m$-$n$ on the basis of the result. For the method for sampling the displacement, it may be uniformly divided into n pieces with 0 displacement as the center, or it may be divided closely near 0 displacement and roughly for portions with a large displacement.

Figure 9:
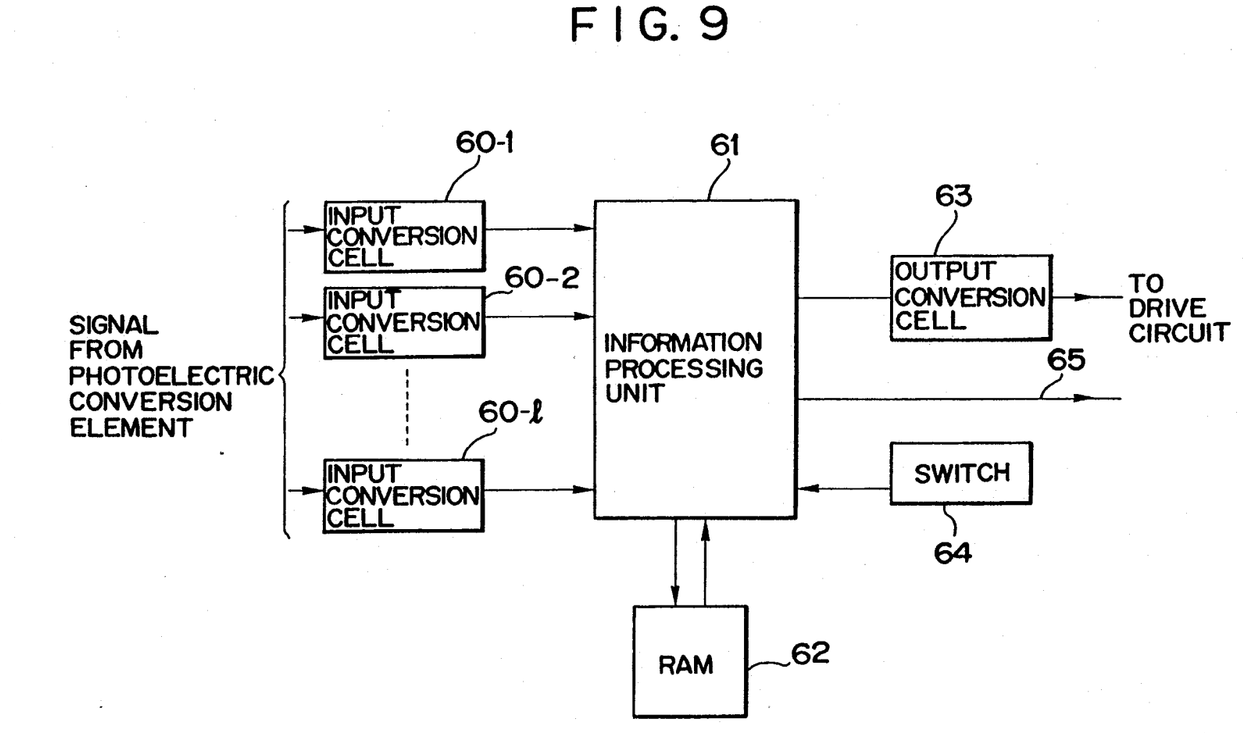
FIG. 9 is a block diagram showing a second configuration example of a neural network used for an optical information processing apparatus according to the present invention.

FIG. 8 shows an embodiment, in which the neural network has been constructed from hardware, and FIG. 9 is an embodiment in which it has been constructed using software using a microcomputer.

In FIG. 9, 60-1 to 60-$l$ are input conversion cells. To these l pieces of input conversion cells, electric signals, which have been photoelectrically converted by each element of the photoelectric conversion element 10 divided into l pieces, are respectively given as mentioned above. In the input conversion cell, analog/digital conversion is performed, and the electric signal is read in by an information processing unit 61 consisting of a microcomputer. In the information processing unit 61, a process specified in FIG. 8 is performed by software basically in accordance with the conventional back propagation method.

The weight of each cell is stored in a random access memory (RAM) 62. An output obtained in the information processing unit 61 is given to an output conversion cell 62 with an error signal for each displacement as a digital signal. In the output conversion cell 63, digital/analog conversion is performed to transmit its output to a drive circuit 12 in the actuator 3. The information processing unit 61 operates in at least learning and information processing modes, and these are switched by a switch 64.

When manufacturing and adjusting the light head, the learning mode is used, and the instructor signal is stored in the internal memory within the information processing unit 61 beforehand at this time. In this case, a displacement of the light spot from the track center position or the focused position is performed by controlling the drive circuit 12 for the actuator and the position control unit 32 for controlling the position of the reference recording medium 31 through a signal 65, which is output from the information processing unit 61, and without using the computer 30 for learning shown in FIG. 5.

No signal is output from the output conversion cell 63 at this time. The displacement is successively changed, an input signal therefor is read, and the operation shown in FIG. 8 is performed by software to compare the result with the instructor signal. Then, the weight of each cell is changed in accordance with the error between the result and the instructor signal to re-write the contents of the RAM 62.

When the learning operation is complete, the switch 64 is switched to the information processing mode. Since the contents of the RAM 62 has been maintained, an error signal to the input signal is calculated using the weight to output to the drive circuit 12. At this time, the signal 65 is not output from the information processing unit 61, but an error signal from the output conversion cell 63 is transmitted to the drive circuit 12 for the actuator. Accordingly, the drive circuit 12 drives the actuator 3 in accordance with the error signal, and moves the objective lens 2 to correct the deviation of the light spot from the tracking and focusing directions.

The present invention can be applied in various ways in addition to the above-mentioned embodiments. For example, an apparatus for both recording and reproducing information has been described in this embodiment, but the present invention can be applied to an apparatus only for recording information or an apparatus only for reproducing information. Similarly, the neural network according to the present invention may be used for both tracking servo and focusing servo operations, and only for either of these servo operations. Also the neural networks for auto-tracking and auto-focusing may be separately provided, and may consist of one neural network.

Further, to amplify a change in light distribution on the multidivided photoelectric conversion element for the displacement or a change in the amount of light itself, an optical filter such as a knife edge and cylindrical lens may be disposed in the optical path.

In the above-mentioned embodiment, a configuration has been used in which an error signal is detected from light beam reflected by the recording medium. However, the present invention is not limited to this embodiment. When the medium is of the transmission type, the apparatus is so constructed that the light detector receives the light beam, which has been transmitted through this medium, and a tracking/focusing error signal is induced from the output signal from this light detector using the neural network.

The present invention includes all the applications such as the above discussed applications so long as these do not deviate from the claims.

I claim:

1. An optical information processing apparatus for at least one of recording and reproducing information by irradiating a converged light beam on a recording medium, comprising:

a light detector for receiving a light beam which has been reflected or transmitted by the medium;

a neural network for receiving an output signal of said light detector and for outputting at least one of a tracking error signal and a focusing error signal, said neural network comparing said at least one of the tracking error signal and the focusing error signal with an instructor signal, and performing a learning operation so that the compared signals coincide; and servo means for performing at least one of a tracking servo operation in accordance with the tracking error signal induced by said neural network and a focusing servo operation in accordance with the focusing error signal induced by said neural network.

2. The optical information processing apparatus according to claim 1, wherein:

said light detector comprises a plurality of photoelectric conversion elements; and said neural network comprises a circuit for weighting the output for each of said plurality of photoelectric conversion elements to produce a plurality of weighted outputs, and a circuit for calculating at least one of the focusing error signal and the tracking error signal by operating on the plurality of weighted outputs.

3. The optical information processing apparatus according to claim 2, wherein
said light detector comprises l pieces of photoelectric conversion elements; and
said neural network comprises:
memory means for storing data on weights for weighting the output for each of said plurality of photoelectric conversion elements;
l pieces of input cells for receiving the output for each of said plurality of photoelectric conversion elements;
a plurality of pieces of first weight cells for weighting an output signal for each input cell in accordance with the data stored in the memory means;
m pieces of intermediate cells for operating on the output signal for the first weight cells, wherein the number of first weight cells is the product of the number l of input cells and the number m of intermediate cells;
a plurality of pieces of second weight cells for weighting an output signal for each intermediate cell in accordance with the data stored in the memory means;
n pieces of output cells for operating on an output signal for the second weight cells, wherein the number of second weight cells is the product of the number m pieces of intermediate cells and the number n pieces of output cells; and
an output conversion cell for converting the output signal for the output cells into at least one of the focusing error signal and the tracking error signal and transmitting the at least one of the focusing error signal and the tracking error signal to said servo means.

4. The optical information processing apparatus according to claim 3, wherein each of said first and second weight cells comprises an amplifier element which amplifies each at least one focusing error signal and tracking error signal by an amplification factor complying with the data stored in said memory means.

5. The optical information processing apparatus according to claim 3, wherein said intermediate cells and said output cells comprise a non-linear element which adds to a positive output signal from said first and second weight cells, subtracts from a negative output signal from said first and second weight cells, and outputs a signal when the result of the adding or subtracting exceeds a specified threshold value.

6. The optical information processing apparatus according to claim 1, wherein:
said light detector comprises a plurality of photoelectric conversion elements; and
said neural network comprises a microcomputer for weighting the output of each of said plurality of photoelectric conversion elements to produce a plurality of weighted outputs, and for operating on the plurality of weighted outputs, and an output conversion cell for converting an arithmetic output of said microcomputer into at least one of the tracking error signal and the focusing error signal and transmitting the at least one of the tracking error signal and focusing error signal to said servo means.

7. The optical information processing apparatus according to claim 6, wherein said neural network further comprises memory means in which data concerning the weight for weighting the output of each of said plurality of photoelectric conversion elements has been stored.

8. The optical information processing apparatus according to claim 6, wherein said neural network further comprises an input conversion cell which converts output signals from a plurality of photoelectric conversion elements into a digital signal and inputs the digital signal into said microcomputer.

9. The optical information processing apparatus according to claim 1, wherein said servo means comprises an actuator for changing the tracking and focusing states of the light beam, and a drive circuit for driving said actuator in accordance with at least one of the tracking error signal and the focusing error signal.

10. The optical information processing apparatus, comprising:
a light source;
an objective lens for converging a light beam emitted from said light source on a recording medium;
an actuator which moves said objective lens at least in one of a direction of the optical axis and a direction perpendicular to the optical axis;
a light detector for receiving the light beam which has been reflected or transmitted by the medium;
a neural network for receiving an output signal of said light detector and for outputting at least one of a tracking error signal and a focusing error signal, said neural network comparing said at least one of the tracking error signal and the focusing error signal with an instructor signal, and performing a learning operation so that the compared signals coincide; and
a servo circuit which feeds back at least one of the tracking error signal and the focusing error signal induced by said neural network into said actuator, and performs at least one of a tracking servo operation and a focusing servo operation.

11. The optical information processing apparatus according to claim 10, wherein:
said light detector comprises a plurality of photoelectric conversion elements; and
said neural network comprises a circuit for weighting the output for each of said plurality of photoelectric conversion elements to produce a plurality of weighted outputs, and a circuit for calculating at least one of the tracking error signal and the focusing error signal by operating on the plurality of weighted outputs.

12. The optical information processing apparatus according to claim 11, wherein:
said light detector consists of l pieces of photoelectric conversion elements; and
said neural network comprises:
memory means for storing data on weights for weighting the output of each of said plurality of photoelectric conversion elements;
l pieces of input cells for receiving the output for each of said plurality of photoelectric conversion elements;
pieces of first weight cells for weighting an output signal for each input cell in accordance with the data stored in the memory means;
m pieces of intermediate cells for operating on the output signal for the first weight cells, wherein the number of first weight cells is the product of the number l of input cells and the number m of intermediate cells;

a plurality of pieces of second weight cells for weighting an output signal for each intermediate cell in accordance with the data stored in the memory means;

n pieces of output cells for operating on an output signal for the second weight cells, wherein the number of second weight cells is the product of the number m pieces of intermediate cells and the number n pieces of output cells; and an output conversion cell for converting the output signal for the output cells into at least one of the focusing error signal and the tracking error signal and transmitting the at least one of the focusing error signal and the tracking error signal to said servo means.

13. The optical information processing apparatus according to claim 12, wherein each of said first and second weight cells comprises an amplifier element which amplifies each at least one focusing error signal and tracking error signal by an amplification factor complying with the data stored in said memory means.

14. The optical information processing apparatus according to claim 12, wherein said intermediate cells and said output cells comprise a non-linear element which adds to a positive output signal from said first and second weight cells, subtracts from a negative output signal from said first and second weight cells and outputs a signal when the result of the adding or subtracting exceeds a specified threshold value.

15. The optical information processing apparatus according to claim 10, wherein:

said light detector comprises a plurality of photoelectric conversion elements; and said neural network comprises a microcomputer for weighting the output of each of said plurality of photoelectric conversion elements to produce a plurality of weighted outputs, and for operating on the plurality of weighted outputs, and an output conversion cell for converting an arithmetic output of said microcomputer into at least one of the tracking error signal and the focusing error signal and transmitting the at least one of the tracking error signal and focusing error signal to said servo means.

16. The optical information processing apparatus according to claim 15, wherein said neural network further comprises memory means in which data concerning the weight for weighting the output of each of said plurality of photoelectric conversion elements has been stored.

17. The optical information processing apparatus according to claim 15, wherein said neural network further comprises an input conversion cell which converts output signals from a plurality of photoelectric conversion elements into a digital signal and inputs the digital signal into said microcomputer.

18. An optical information processing apparatus for at least one of recording and reproducing information by irradiating a converged light beam on a recording medium, comprising:

a light detector for receiving a light beam which has been reflected or transmitted by the medium, which comprises a plurality of photoelectric conversion elements;

a neural network for inducing at least one of a tracking error signal and a focusing error signal from an output signal from said light detector, said neural network comprising a circuit for weighting the output of each of said photoelectric conversion elements to produce a plurality of weighted outputs and for calculating at least one of the tracking error signal and the focusing error signal by operating on the plurality of weighted outputs after weighting the output of each of said plurality of photoelectric conversion elements, said neural network further comprising a circuit for comparing said at least one of the tracking error signal and the focusing error signal with an instructor signal, and changing the weight for weighting said output so that the compared signals coincide; and servo means for performing at least one of a tracking servo operation in accordance with the tracking error signal induced by said neural network and a focusing servo operation in accordance with the focusing error signal induced by said neural network.

19. The optical information processing apparatus according to claim 18, wherein:

said light detector consists of l pieces of photoelectric conversion elements; and said neural network comprises:

memory means for storing data on weights for weighting the output for each of said plurality of photoelectric conversion elements;

l pieces of input cells for receiving the output for each of said plurality of photoelectric conversion elements;

pieces of first weight cell for weighting an output signal for each input cell in accordance with the data stored in the memory means;

m pieces of intermediate cells for operating on the output signal for the first weight cells, wherein the number of first weight cells is the product of the number l of input cells and the number m of intermediate cells;

a plurality of pieces of second weight cells for weighting an output signal for each intermediate cell in accordance with the data stored in said memory means;

n pieces of output cells for operating on an output signal for the second weight cells, wherein the number of second weight cells is the product of the number m pieces of intermediate cells and the number n pieces of output cells; and an output conversion cell for converting the output signal for the output cells into and transmitting the at least one of the focusing error signal and the tracking error signal to said servo means.

20. The optical information processing apparatus according to claim 19, wherein each of said first and second weight cells comprises an amplifier elements which amplifies each at least one focusing error signal and tracking error signal by an amplification factor complying with the data stored in said memory means.

21. The optical information processing apparatus according to claim 19, wherein said intermediate cells and said output cells comprise a non-linear element which adds to a positive output signal from said first and second weight cells, subtracts from a negative output signal from said first and second weight cells and outputs a signal when the result of the adding or subtracting exceeds a specified threshold value.

22. The optical information processing apparatus according to claim 18, wherein:

said light detector comprises a plurality of photoelectric conversion elements; and said neural network comprises a microcomputer for weighting the output of each of said plurality of photoelectric conversion elements to produce a plurality of weighted outputs, and for operating on the plurality of weighted outputs, and an output conversion cell for converting an arithmetic output of said microcomputer into at least one of the tracking error signal and the focusing error signal and transmitting the at least one of the tracking error signal and focusing error signal to said servo means.

23. The optical information processing apparatus according to claim 22, wherein said neural network further comprises memory means in which data concerning the weight for weighting the output of each of said plurality of photoelectric conversion elements has been stored.

24. The optical information processing apparatus according to claim 22, wherein said neural network further comprises an input conversion cell which converts output signal from a plurality of photoelectric conversion elements into a digital signal and inputs the digital signal into said microcomputer.

25. The optical information processing apparatus according to claim 18, wherein said servo means comprises an actuator for changing the tracking and focusing states of the light beam, and a drive circuit for driving said actuator in accordance with at least one of the tracking errors signal and the focusing error signal.

26. A method of adjusting an optical information processing apparatus, comprising means for irradiating a converged light beam on a recording medium, a light detector for receiving a light beam which has been reflected or transmitted by the medium, which comprises a plurality of photoelectric conversion elements, a neural network for inducing at least one of a tracking error signal and a focusing error signal from an output signal from the light detector, wherein the neural network comprises a circuit for weighting the output of each of the photoelectric conversion elements to produce a plurality of weighted outputs and for calculating at least one of the tracking error signal and the focusing error signal by operating on the plurality of weighted outputs after weighting the output of each of the plurality of photoelectric conversion elements, and servo means for performing at least one of a tracking servo operation in accordance with the tracking error signal induced by the neural network and a focusing servo operation in accordance with the focusing error signal induced by the neural network, comprising the steps of:

locating the medium and the light beam at specified relative positions;

comparing at least one of the tracking error signal and the focusing error signal output from the neural network with a reference value; and changing the weight given to the output of each of the plurality of photoelectric conversion elements in accordance with the comparison result in said comparing step.

27. The method of adjusting an optical information processing apparatus according to claim 26, further comprising the steps of repeating said comparing and changing steps until at least one of the tracking error signal and the focusing error signal coincides with the reference value.

28. The method of adjusting an optical information processing apparatus according to claim 26, wherein said locating, comparing, and changing steps are performed with reference to each of a plurality of predetermined locations different from each other for the medium and the light beam.

29. The method of adjusting an optical information processing apparatus according to claim 26, wherein the neural network further comprises memory means, in which data on weights for weighting the output of each of the photoelectric conversion elements has been stored, and wherein said method further comprises the step of changing the weight given to the output of each of the plurality of photoelectric conversion elements by rewriting the data stored in the memory means.

30. An apparatus for adjusting an optical information processing apparatus, comprising means for irradiating a converged light beam on a recording medium, a light detector for receiving a light beam which has been reflected or transmitted by the medium, which comprises a plurality of photoelectric conversion elements, a neural network for inducing at least one of a tracking error signal and a focusing error signal from an output signal from the light detector, wherein the neural network comprises a circuit for weighting the output of each of the plurality of photoelectric conversion elements to produce a plurality of weighted outputs, and a circuit for calculating at least one of the tracking error signal and the focusing error signal by operating on the plurality of weighted outputs, and servo means for performing at least one of a tracking servo operation in accordance with the tracking error signal induced by the neural network and a focusing servo operation in accordance with the focusing error signal induced by the neural network, comprising:

means for changing the relative positions of the medium and the light beam;

means for comparing at least one of the tracking error signal and the focusing error signal output from the neural network with a reference value; and means for changing the weight given to the output of each of the plurality of photoelectric conversion elements in the weighting circuit in accordance with the comparison result.

31. The apparatus for adjusting an optical information processing apparatus according to claim 30, wherein the neural network further comprises memory means, in which data on weights for weighting the output of each of the photoelectric conversion elements has been stored, and wherein said changing means changes the weight given to the output of each of the plurality of photoelectric conversion elements by rewriting the data stored in said memory means.

* * * * *

UNITED STATES PATENT AND TRADEMARK OFFICE
CERTIFICATE OF CORRECTION

PATENT NO. : 5,333,125
DATED : July 26, 1994
INVENTOR(S) : MASAKUNI YAMAMOTO

It is certified that error appears in the above-indentified patent and that said Letters Patent is hereby corrected as shown below:

COLUMN 4

Line 23, "has" should read --have--.

COLUMN 5

Line 64, "limited" should read --limited to--.

COLUMN 6

Line 68, "an" should read --a--.

COLUMN 8

Line 26, "light" should read --the light--.

COLUMN 9

Line 2, "wherein" should read --wherein:--.

COLUMN 10

Line 15, "The" should read --An--.
Line 56, "of each" should read --for each--.

UNITED STATES PATENT AND TRADEMARK OFFICE
CERTIFICATE OF CORRECTION

PATENT NO. : 5,333,125

DATED : July 26, 1994

INVENTOR(S) : MASAKUNI YAMAMOTO

It is certified that error appears in the above-indentified patent and that said Letters Patent is hereby corrected as shown below:

<u>COLUMN 12</u>

Line 30, "cell" should read --cells--.
Line 53, "elements" should read --element--.

<u>COLUMN 13</u>

Line 21, "signal" should read --signals--.

Signed and Sealed this

Third Day of January, 1995

Attest:

BRUCE LEHMAN

*Attesting Officer*    *Commissioner of Patents and Trademarks*